(12) United States Patent
Theis et al.

(10) Patent No.: US 10,689,042 B2
(45) Date of Patent: Jun. 23, 2020

(54) VEHICLES AND METHODS FOR REDUCING AERODYNAMIC DRAG OF VEHICLES

(71) Applicant: GM GLOBAL TECHNOLOGY OPERATIONS LLC, Detroit, MI (US)

(72) Inventors: Nicholas D. Theis, St. Johns, MI (US); Michael McGuire, Milford, MI (US); Scott W. Damman, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 458 days.

(21) Appl. No.: 15/494,370

(22) Filed: Apr. 21, 2017

(65) Prior Publication Data

US 2018/0304940 A1  Oct. 25, 2018

(51) Int. Cl.
*B62D 35/00* (2006.01)

(52) U.S. Cl.
CPC ............... *B62D 35/00* (2013.01); *Y02T 10/82* (2013.01); *Y02T 10/88* (2013.01)

(58) Field of Classification Search
CPC ......... B62D 35/00; B62D 37/02; Y02T 10/88; Y02T 10/82
See application file for complete search history.

(56) References Cited

U.S. PATENT DOCUMENTS

| | | | |
|---|---|---|---|
| 2012/0032619 A1* | 2/2012 | Kobayashi | B06B 1/045 318/128 |
| 2015/0054302 A1* | 2/2015 | Yamaguchi | F15D 1/008 296/180.1 |
| 2016/0290435 A1* | 10/2016 | Kwon | F16F 15/1442 |
| 2018/0029591 A1* | 2/2018 | Lavoie | B60W 30/06 |
| 2018/0072230 A1* | 3/2018 | Dudar | B60R 1/074 |

* cited by examiner

*Primary Examiner* — Hunter B Lonsberry
*Assistant Examiner* — Mathew Franklin Gordon
(74) *Attorney, Agent, or Firm* — Lorenz & Kopf, LLP

(57) ABSTRACT

Vehicles and methods for controlling operation of a vehicle and/or reducing aerodynamic drag of a vehicle are provided. A method for controlling operation of an unoccupied vehicle includes determining that the vehicle is unoccupied. The method further includes identifying an energy savings resulting from a reduction of aerodynamic drag of the vehicle due to a controlled vibration of a component of the vehicle. Also, the method includes applying the controlled vibration to the component of the vehicle.

20 Claims, 3 Drawing Sheets

VEHICLES AND METHODS FOR REDUCING AERODYNAMIC DRAG OF VEHICLES

INTRODUCTION

The present invention generally relates to vehicle aerodynamics, and more particularly relates to the application of a vibration to an exterior portion of a vehicle to reduce drag and increase fuel efficiency of the vehicle.

There has been a continuing effort to improve the fuel efficiency of vehicles, in order to reduce fuel costs and/or emissions, among other concerns. For example, some efforts focused on aerodynamic design of vehicle bodies. Other efforts have concentrated on improving the efficiency of internal components in transforming power from fuel to linear vehicle motion. Still other efforts focused on improving the efficiency of energy harvesting from combustion through improved fuel compositions and fuel additives.

The development of autonomous vehicles has potentially opened new avenues to improving vehicle aerodynamics to reduce aerodynamic drag and increase fuel efficiency. For example, designs or conditions in which a human operator could not physically or comfortably drive may now be utilized in unoccupied modes. Further, designs or conditions in which a human could not physically or comfortably ride are now possible for non-occupied vehicles.

Accordingly, it is desirable to provide methods for reducing aerodynamic drag of a vehicle. For example, it is desirable to provide methods for reducing aerodynamic drag of an unoccupied vehicle, such as a non-occupied driverless vehicle. Furthermore, other desirable features and characteristics of the present invention will become apparent from the subsequent detailed description of the invention and the appended claims, taken in conjunction with the accompanying drawings and the background of the invention.

SUMMARY

A method is provided for controlling operation of an unoccupied vehicle. The method includes determining that the vehicle is not occupied. The method further includes identifying an energy savings resulting from a reduction of aerodynamic drag of the unoccupied vehicle due to a controlled vibration of a component of the unoccupied vehicle. Also, the method includes applying the controlled vibration to the component of the unoccupied vehicle.

A method is provided for reducing aerodynamic drag of a vehicle. The method for reducing aerodynamic drag of a vehicle includes applying a controlled vibration with a selected amplitude and a selected frequency to a external surface of the vehicle.

A vehicle is provided and includes a vibration device configured to apply a controlled vibration to the external surface of the vehicle. The vehicle further includes a sensor for sensing a vehicle parameter. Also, the vehicle includes a processor in communication with the sensor and configured to identify a potential energy savings resulting from applying the controlled vibration to the external surface of the vehicle by analyzing the vehicle parameter and to activate the vibration device to apply the controlled vibration to the external surface of the vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Figure 2:
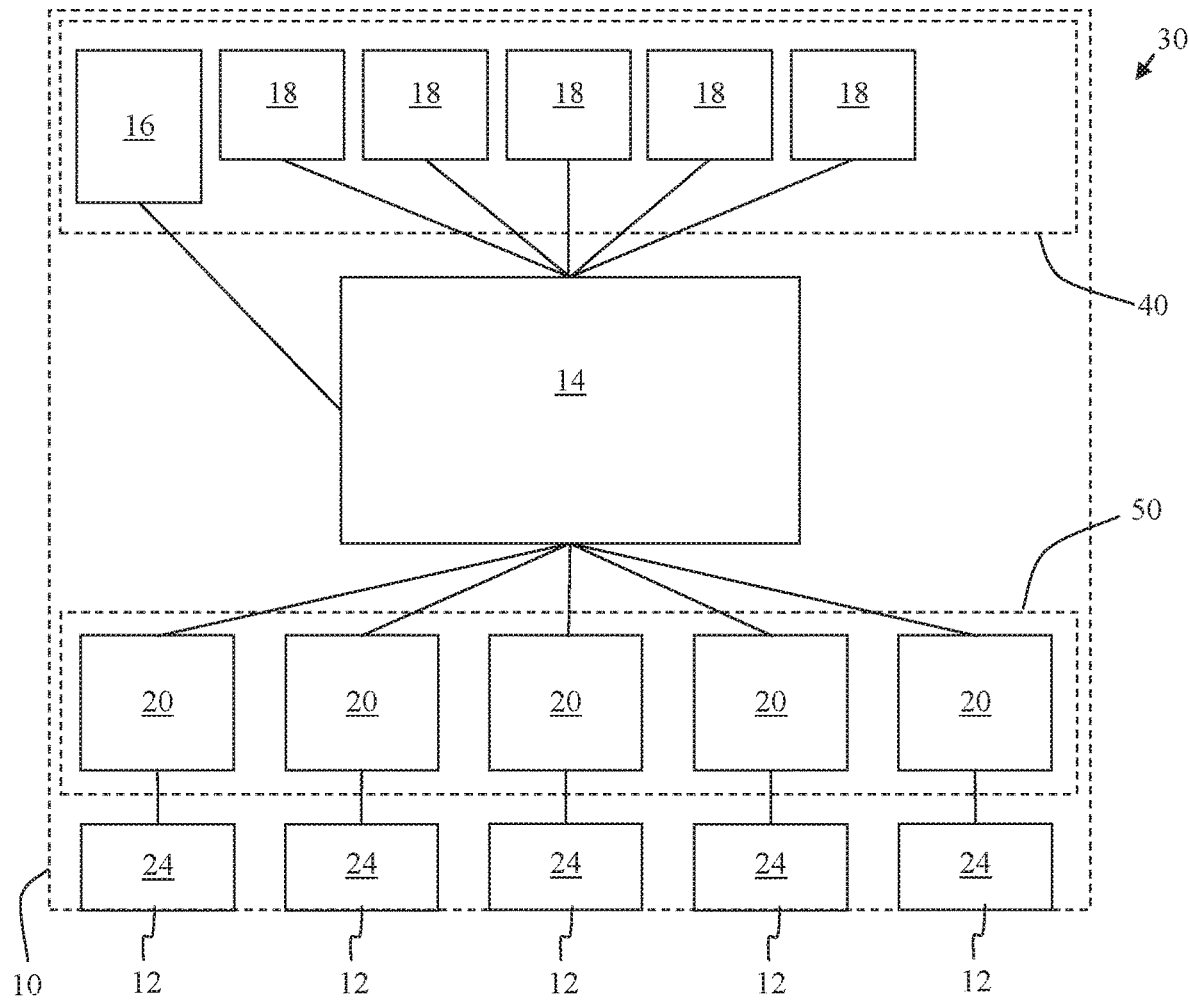
FIG. 2 is a schematic diagram illustrating the vehicle of FIG. 1 and a system for reducing aerodynamic drag of the vehicle in accordance with an embodiment provided herein.
Figure 3:
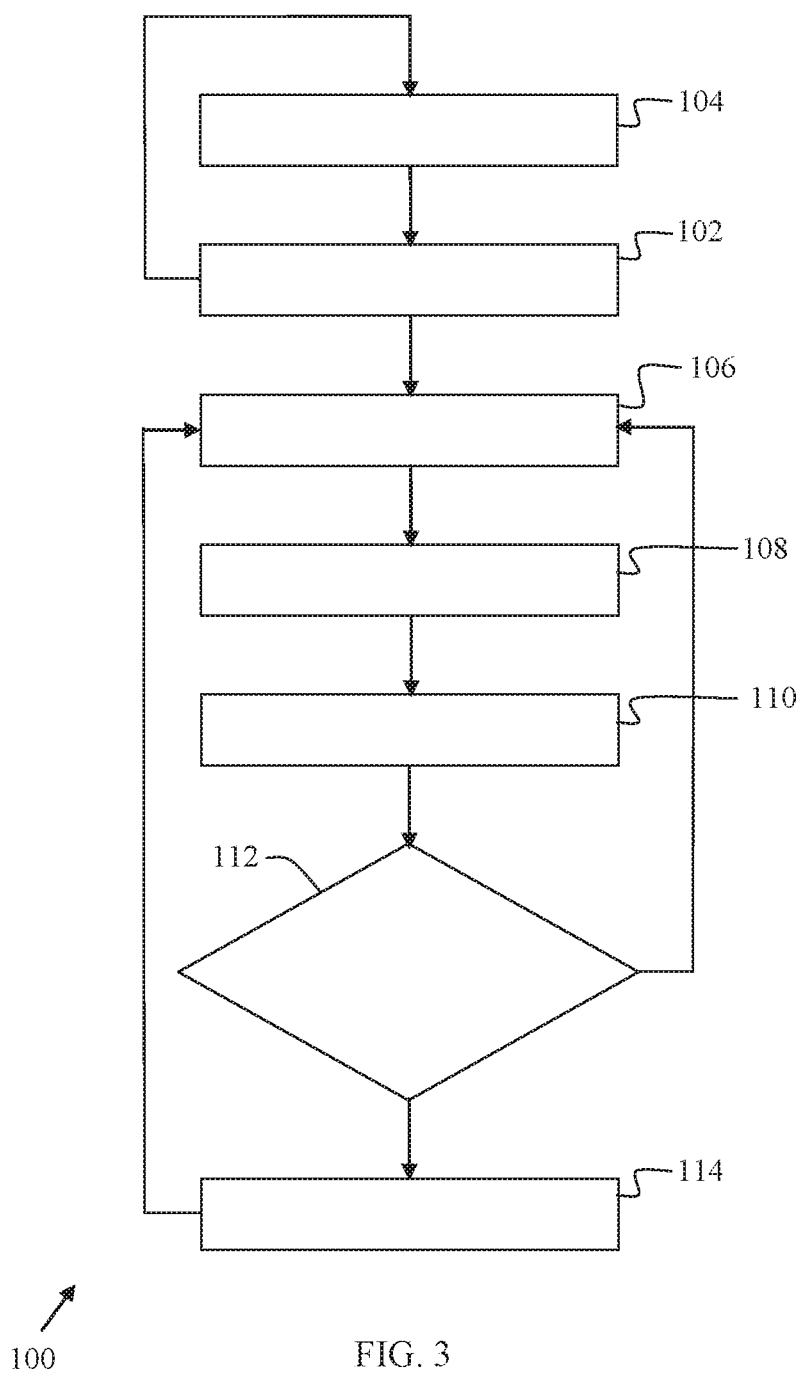
FIG. 3 is a flow chart illustrating steps of an exemplary method for reducing aerodynamic drag of the vehicle in accordance with an embodiment provided herein.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-3 are merely illustrative and may not be drawn to scale.

Embodiments herein provide for reducing aerodynamic drag on a vehicle by selectively applying controlled vibration to selected external surfaces of the vehicle, i.e., by vibrating the external surfaces of the vehicle. It has been determined that vibrating selected external surfaces at selected frequencies and amplitudes can reduce aerodynamic drag, depending on various vehicle parameters. Methods, systems and vehicles herein are provided to determine the optimal application of controlled vibrations to external surfaces, and to determine whether the energy exerted to provide such controlled vibrations is less than the energy savings due to the reduction in aerodynamic drag.

Figure 1:
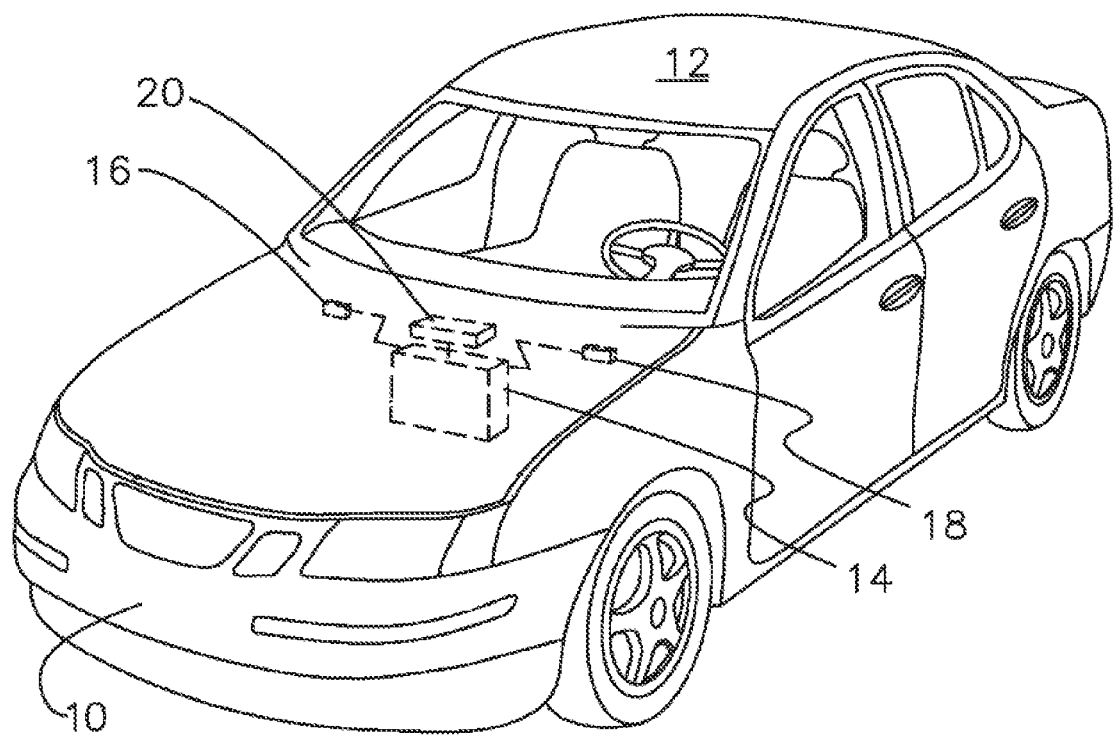
FIG. 1 is a perspective view of a vehicle, in accordance with an embodiment provided herein.

FIG. 1 illustrates a vehicle 10. An exemplary vehicle 10 is an automobile, truck, or SUV. In an exemplary embodiment, the vehicle 10 is an unoccupied vehicle, i.e., an autonomous vehicle that does not require a human driver and holds no passengers. As shown, vehicle 10 has an external surface 12. An exemplary external surface 12 may be formed by various components of the vehicle 10, including the hood, roof, decklid, front fascia, cowl, air inlet panel, rear fascia, windshield, windows, lift gate, spoiler, door, roof rack, body panel, wheel house cover, or undercarriage component.

As further shown, the vehicle is provided with a processor 14 in communication with a sensor 16, a sensor 18, and an activation device 20. Activation device 20 is configured to apply a controlled vibration to the external surface 12 of the vehicle 10. In certain embodiments, activation device 20 may be physically coupled to the external surface 12 of the vehicle 10. Specifically, in FIG. 1, activation device 20 is coupled to the external surface 12 formed by the hood of the vehicle 10.

In an exemplary embodiment, the sensor 16 is configured to sense whether the vehicle is un-occupied. Specifically, sensor 16 may sense whether there is a driver present in the vehicle, as an autonomous vehicle 10 may be selectively self-driven or human-driven, and/or whether there are passengers in the vehicle 10. Sensor 16 may use any suitable sensor devices or systems for sensing whether the vehicle is un-occupied. For example, sensor 16 may incorporate weight or mass sensors in vehicle seats or flooring, heat sensors, motion sensors, microphones, accelerometers, strain gages, cameras, infrared sensors or cameras or other suitable sensors. Further, while a single sensor 16 is illustrated in FIG. 1, it is understood that sensor 16 may represent a plurality of sensors, including different types of sensors.

In an exemplary embodiment, a sensor 18 senses vehicle parameters such as altitude, temperature, air pressure, vehicle velocity and direction, vehicle yaw rate, air velocity and direction, road profile, road grade, steering wheel position, vehicle acceleration, engine torque, and tire pressure. Vehicle 10 may be provided with a plurality of sensors 18, including a plurality of each type of sensor for sensing a select vehicle parameter. An exemplary sensor 18 may be a receiver for telematic information, such as from a global positioning system (GPS) or other positioning system, a compass, a barometer, a speedometer, a thermometer, a microelectromechanical system (MEMS) device, a piezoresistive strain gauge, a capacitive device, a magnetic device, a piezoelectric device, an optical device, a potentiometric device, a resonant device, or an inertial device.

Together, sensor 16 and sensor 18 may be considered to form a diagnostic system. The diagnostic system may be employed to sense and measure the described parameters. Further, sensors 16 and 18 are electronically coupled, through wired or wireless connection, to the processor 14. Processor 14 may include various modules for receiving and converting signals from each sensor 16 and 18, and for processing signals. Further, the processor 14 may include or be in communication with memory for storing libraries of comparative data. For example, the processor 14 may receive data from sensor 16 indicating that less than 5 kilograms (kg), i.e., substantially no additional weight or mass, is measured on the vehicle seats and flooring. Thus, processor 14 may compare the data received from sensor 16 with a threshold value to determine whether the vehicle is unoccupied. Further, the processor 14 may receive data from sensors 18 relating to the vehicle parameters selected from altitude, temperature, air pressure, vehicle velocity and direction, vehicle yaw rate, air velocity and direction, road profile, and/or tire pressure.

The processor 14 is further coupled to activation devices 20. Each exemplary activation device 20 is configured to apply a controlled vibration to a selected external surface 12 of the vehicle 10. Vehicle 10 may include a plurality of activation devices 20, including a plurality of activation devices 20 at each external component, such as the hood, roof, decklid, front fascia, cowl, air inlet panel, rear fascia, windshield, windows, lift gate, spoiler, door, roof rack, body panel, wheel house cover, and undercarriage component.

In an exemplary embodiment, each activation device 20 is configured to apply a controlled vibration to the external surface 12 to which the activation device 20 is coupled. Specifically, each activation device may be configured to apply a vibration at a selected frequency and selected amplitude depending on vehicle conditions. An exemplary activation device 20 is an inertial shaker, electrodynamic exciter, sound source, piezoelectric actuator, active mechanical linkage, torque converter clutch slip, electric propulsion motor, shape memory alloy, or active suspension damper. Such an activation device 20 may be coupled to another vehicle component to convert kinetic energy from the other component to vibrational energy applied to the external surface 12. Further, an exemplary activation device 20 may be connected to a power source, such as the automobile battery, and powered with an excitation energy from the power source.

The processor 14 is programmed with, or programmed to calculate, energy costs for applying the controlled vibration at a selected frequency and selected amplitude at each activation device 20. For example, the processor 14 may be programmed with, or programmed to calculate, an excitation energy necessary to apply each controlled vibration at each activation device 20. Further, the exemplary processor 14 is configured to analyze the vehicle parameters received from the sensors 18 and to identify an energy savings resulting from a reduction of aerodynamic drag of the vehicle 10 due to controlled vibrations applied by each activation device 20 or by selected combinations of activation devices 20. For example, the processor 14 may have programmed equations or tables pertaining to the reduction in aerodynamic drag resulting from vibrating each selected external surface 12 at selected frequencies and selected amplitudes.

In certain embodiments, the processor 14 may compare the energy savings resulting from a reduction in aerodynamic drag of the vehicle 10 and the energy costs, i.e., the excitation energy, for applying the controlled vibration at each selected activation device 20. Such comparison may be used in determining whether to initiate a controlled vibration by the activation devices 20, i.e., whether the processor 14 directs the activation devices 20 to apply the controlled vibration.

Further, in an exemplary embodiment, the sensors 18 continue to sense the vehicle parameters while the vehicle 10 is operated. Likewise, the processor 14 continues to calculate energy costs for applying controlled vibrations and energy savings from reduction in aerodynamic drag of the vehicle 10 due to the controlled vibrations. In an exemplary embodiment, the processor 14 receives data from various sensors 16 and 18 over a fixed period of time or interval. The interval may last any suitable duration of time, but is identified as being five seconds in the exemplary embodiment herein. The processor 14 compares the data received in the immediate interval to data received during the next previous interval. For example, data received during the immediately concluded five second interval (0 to 5 seconds ago) is compared to data received during the previous five second interval (5 to 10 seconds ago). The processor 14 utilizes this comparison to predict what the vehicle conditions will be at the time the vehicle is able to change its current operation state. The processor feeds the predicted vehicle conditions into a lookup table that decides upon the most efficient way to operate the vehicle, i.e., at what locations on the vehicle and at what frequency/amplitude vibrations are applied. This table is generated based upon testing and CAE analysis. The processor 14 will maintain the vehicle at the operating state until the next cycle, when the processor compares data and predicts vehicle conditions.

Thus, the processor 14 may constantly calculate and monitor the energy savings resulting from the reduction of aerodynamic drag of the vehicle 10 and may adjust the controlled vibration to obtain an optimized energy savings. For example, vibration at selected activation devices 20 may be deactivated or activated, or modified by increasing or decreasing frequency and/or amplitude.

Thus, different controlled vibrations may be applied at different locations and may be continually adjusted to optimize vehicle aerodynamics. For example, the processor 14 may signal a first activation device 20 to apply a first controlled vibration with a first selected amplitude and a first selected frequency to the external surface 12 of the vehicle 10 at a first component or location, and may signal a second activation device 20 to apply a second controlled vibration with a second selected amplitude and a second selected frequency to the external surface 12 of the vehicle 10 at a second component or location. Further, the processor 14 may adjust the first and second controlled vibrations, i.e., the frequency and/or amplitude of the first and second controlled vibrations, to optimize vehicle aerodynamics.

FIG. 2 is a schematic illustrating the interconnection of components of FIG. 1 in a system 30. As shown, vehicle 10 includes a plurality of external components 24 having external surfaces 12. For example, the external components 24 may be a hood, roof, decklid, front fascia, cowl, air inlet panel, rear fascia, windshield, windows, lift gate, spoiler, door, roof rack, body panel, wheel house cover, or undercarriage component.

Vehicle 10 in FIG. 2 includes a diagnostic system 40 that includes a sensor 16 and a plurality of sensors 18. In certain embodiments, sensor 16 may be considered to be one of the plurality of sensors 18. Further, sensor 16 may represent more than one sensor 16. As shown, each sensor 16 and 18 is electronically coupled to the processor 14. The connection between each sensor 16 and 18 and the processor 14 may be wired or wireless.

Also, processor 14 is electronically coupled to each activation device 20. The connection between the processor 14 and each activation device 20 may be wired or wireless. The activation devices 20 may be included in an activation system 50 that is interconnected between the processor 14 and the external components 24.

Each activation device 20 may be physically coupled to the respective external component 24. However, physically connection between an activation device 20 and the respective external component 24 is not necessary. For example, an activation device 20 may apply a controlled vibration to the respective external component 24 by directing air (or another gas) or sound waves onto the respective external component 24 without a physical connection between the activation device 20 and the respective external component 24.

A method 100 for operating the system 30 of the vehicle 10 of FIG. 2 is illustrated in FIG. 3. The method 100 includes, at step 102, determining that the vehicle is not occupied. For example, sensor 16 may sense if the vehicle is occupied. Step 102 may be performed when the vehicle is occupied and powered up. This step may be optional in certain embodiments. For example, in embodiments in which the controlled vibration is not distracting or bothersome to a driver or passengers, step 102 need not be followed. In cases in which controlled vibration may affect a driver's ability to safely operate the vehicle or bother the driver or passengers, step 102 may prevent application of the controlled vibration on external surfaces of the vehicle. Specifically, if the vehicle is occupied at step 102, then the method 100 proceeds to step 104, where the vehicle is maintained in a condition of no vibration applied.

If the vehicle is not occupied, or in embodiments in which occupied status is irrelevant, the method 100 may continue at step 106 in which vehicle parameters are sensed. For example, sensors 18 may sense vehicle parameters as described above. The vehicle parameters are communicated from the sensors 18 to the processor 14. Processor 14 performs step 108 in which energy savings are identified, i.e., that the vehicle parameters indicate that a controlled vibration scheme will reduce aerodynamic drag. For example, the processor 14 may analyze potential schemes for applying controlled vibrations to selected external surfaces of the vehicle in view of the vehicle parameters received from the sensors 18. Such analysis is performed to determine how much aerodynamic drag can be reduced and energy costs can be reduced due to the controlled vibrations of components of the vehicle. Further, the processor 14 may retrieve energy savings values or may calculate energy savings values based on the optimized or otherwise selected scheme for applying controlled vibrations.

At step 110, the processor 14 may identify the excitation energy needed to apply the selected controlled vibrations to the selected external surface in the selected scheme, i.e., the excitation energy costs. For example, the processor 14 may calculate the excitation energy costs. Further, at inquiry block 112, the processor 14 compares the excited energy costs identified in step 110 with the energy savings identified in step 108.

If energy savings are not greater than the excitation energy costs, then the method 100 does not apply the controlled vibration to the selected external surfaces. Rather, the method 100 repeats step 106 and continues in a loop until the vehicle is powered down or the processor is instructed to terminate method 100.

If energy savings are greater than the excitation energy costs at inquiry block 112, then the method 100 applies the controlled vibration to the selected external surfaces at step 114. Further, the method 100 repeats step 106 and may continue with real time vehicle parameter sensing and gathering to further update and modify the scheme for applying the controlled vibration. Repetition of steps 106 through 114 provides for continual monitoring of the energy savings resulting from the reduction of aerodynamic drag of the vehicle and allows for adjusting the controlled vibration to obtain an optimized energy savings. For example, the method 100 may modify an amplitude and/or a frequency of the controlled vibration applied to the component of the unoccupied vehicle based on the continually sensed vehicle parameters.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A method for controlling operation of an unoccupied vehicle, the method comprising:
   determining that a vehicle is unoccupied;
   analyzing one or more vehicle parameters selected from altitude, temperature, pressure, vehicle velocity and direction, vehicle yaw rate, air velocity and direction, and road profile to identify an energy savings resulting from a reduction of aerodynamic drag of the unoccupied vehicle due to a controlled vibration of an external surface of a component of the vehicle that impacts aerodynamic drag of the vehicle; and
   reducing the aerodynamic drag of the component of the vehicle by applying the controlled vibration to the component of the vehicle to vibrate the external surface of the component of the vehicle.

2. The method for claim 1 further comprising:
   monitoring the energy savings resulting from the reduction of aerodynamic drag of the vehicle; and
   adjusting the controlled vibration to obtain an optimized energy savings.

3. The method for claim 1 wherein applying the controlled vibration to the component of the vehicle comprises applying the controlled vibration to the component of the vehicle with a vibration device, and wherein the vibration device is selected from an inertial shaker, electrodynamic exciter, sound source, piezoelectric actuator, active mechanical linkage, torque converter clutch slip, electric propulsion motor, shape memory alloy, or active suspension damper.

4. The method for claim 1 wherein applying the controlled vibration to the component of the vehicle comprises applying the controlled vibration to a component selected from a hood, roof, decklid, front fascia, cowl, air inlet panel, rear fascia, windshield, window, lift gate, spoiler, door, roof rack, body panel, wheel house cover, or undercarriage component.

5. The method for claim 1 wherein applying the controlled vibration to the component of the vehicle comprises:
   applying a first controlled vibration with a first selected amplitude and a first selected frequency, determined according to the analyzed vehicle parameters, to a first component of the vehicle; and
   applying a second controlled vibration with a second selected amplitude and a second selected frequency, determined according to the analyzed vehicle parameters, to a second component of the vehicle.

6. The method for claim 1 wherein applying the controlled vibration to the component of the vehicle comprises:
   applying a first controlled vibration to a first component of the vehicle and vibrating the external surface of the first component of the vehicle at a first selected amplitude and a first selected frequency; and
   applying a second controlled vibration to a second component of the vehicle and vibrating the external surface of the second component of the vehicle at a second selected amplitude different from the first selected amplitude and a second selected frequency different from the first selected frequency.

7. The method for claim 1 wherein applying the controlled vibration to the component of the vehicle comprises applying the controlled vibration to the component of the vehicle with a vibration device, and wherein the method further comprises activating the vibration device to apply the controlled vibration to the component of the vehicle when the energy savings are greater than an excitation energy required to apply the controlled vibration to the component of the vehicle.

8. The method for claim 1 further comprising:
   after applying the controlled vibration to the component of the vehicle, analyzing vehicle parameters selected from altitude, temperature, pressure, vehicle velocity and direction, air velocity and direction, road profile; and
   modifying an amplitude and/or a frequency of the controlled vibration applied to the component of the vehicle based on the vehicle parameters.

9. A method for reducing aerodynamic drag of a vehicle, the method comprising:
   identifying a potential energy savings resulting from applying a controlled vibration to an external surface of the vehicle that impacts aerodynamic drag of the vehicle by analyzing one or more vehicle parameters selected from altitude, temperature, pressure, vehicle velocity and direction, air velocity and direction, road profile; and
   reducing the aerodynamic drag of the vehicle by applying a controlled vibration with a selected amplitude and a selected frequency to the external surface of the vehicle.

10. The method for claim 9 wherein applying the controlled vibration comprises applying the controlled vibration to the external surface of the vehicle with a vibration device, and wherein the vibration device is selected from an inertial shaker, electrodynamic exciter, sound source, piezoelectric actuator, active mechanical linkage, torque converter clutch slip, electric propulsion motor, shape memory alloy, or active suspension damper.

11. The method for claim 9 wherein applying the controlled vibration to the external surface of the vehicle comprises applying the controlled vibration to a selected external vehicle component selected from a hood, roof, decklid, front fascia, cowl, air inlet panel, rear fascia, windshield, window, lift gate, spoiler, door, roof rack, body panel, wheel house cover, or undercarriage component.

12. The method for claim 9 wherein applying the controlled vibration to the external surface of the vehicle comprises:
   applying a first controlled vibration with a first selected amplitude and a first selected frequency to a first external vehicle component; and
   applying a second controlled vibration with a second selected amplitude and a second selected frequency to a second external vehicle component.

13. The method for claim 9 wherein applying the controlled vibration with the selected amplitude and the selected frequency to the external surface of the vehicle comprises applying the controlled vibration to a windshield of the vehicle.

14. The method for claim 9 wherein applying the controlled vibration comprises applying the controlled vibration to the external surface of the vehicle with a vibration device, and wherein the method further comprises:
   activating the vibration device to apply the controlled vibration to the external surface of the vehicle when the potential energy savings are greater than an excitation energy required to apply the controlled vibration to the external surface of the vehicle.

15. The method for claim 9 further comprising:
   analyzing vehicle parameters selected from altitude, temperature, pressure, vehicle velocity and direction, air velocity and direction, road profile; and modifying the selected amplitude and/or the selected frequency of the controlled vibration applied to the external surface of the vehicle based on the vehicle parameters.

16. A vehicle comprising:
a non-enclosed external surface of the vehicle that impacts aerodynamic drag of the vehicle:
a vibration device configured to apply a controlled vibration to the non-enclosed external surface of the vehicle that impacts aerodynamic drag of the vehicle;
a sensor for sensing a vehicle parameter including one or more of altitude, temperature, pressure, vehicle velocity and direction, air velocity and direction, and road profile; and
a processor in communication with the sensor and configured to identify a potential energy savings resulting from applying the controlled vibration to the external surface of the vehicle by analyzing the vehicle parameter and to activate the vibration device to apply the controlled vibration to the non-enclosed external surface of the vehicle to reduce the aerodynamic drag of the vehicle.

17. The vehicle of claim 16 wherein the vibration device is selected from an inertial shaker, electrodynamic exciter, sound source, piezoelectric actuator, active mechanical linkage, torque converter clutch slip, electric propulsion motor, shape memory alloy, or active suspension damper.

18. The vehicle of claim 16 wherein the external surface is an external surface of a vehicle component selected from a hood, roof, decklid, front fascia, cowl, air inlet panel, rear fascia, windshield, window, lift gate, spoiler, door, roof rack, body panel, wheel house cover, or undercarriage component.

19. The vehicle of claim 16 wherein the vibration device comprises first activation device configured to vibrate the external surface of a first component of the vehicle at a first selected amplitude and a first selected frequency, and wherein the vehicle further comprises a second activation device configured to vibrate the external surface of a second component of the vehicle at a second selected amplitude different from the first selected amplitude and at a second selected frequency different from the first selected frequency.

20. The vehicle of claim 16 further comprising a cabin sensor for sensing whether the vehicle is not occupied, wherein the cabin sensor is in communication with the processor.

* * * * *